J. E. DELHOMME.
BELT TIGHTENING DEVICE.
APPLICATION FILED FEB. 13, 1907.

919,548.  Patented Apr. 27, 1909.

WITNESSES
W. Ray Taylor
J. Ellis Glen

INVENTOR
JULES ERNEST DELHOMME
by Albert A. Dann
Atty.

UNITED STATES PATENT OFFICE.

JULES ERNEST DELHOMME, OF PARIS, FRANCE, ASSIGNOR TO GENERAL ELECTRIC COMPANY, A CORPORATION OF NEW YORK.

BELT-TIGHTENING DEVICE.

No. 919,548.　　　Specification of Letters Patent.　　　Patented April 27, 1909.

Application filed February 13, 1907. Serial No. 357,142.

*To all whom it may concern:*

Be it known that I, JULES ERNEST DELHOMME, a citizen of France, residing at Paris, France, have invented certain new and useful Improvements in Belt-Tightening Devices, of which the following is a specification.

It is customary in the case of dynamo-electric and other machines, to mount them upon bases along which they may be moved within limits, in order to control the tension of the belt or other power-transmitting means. It is usual to employ for this purpose screws coöperating, respectively, with the frame of the machine and a member fixed to the base, whereby, when the screw is turned, a relative movement is effected between the machine and the base. When it is necessary to provide for a considerable adjustment, long screws are required, detracting not only from the appearance of the machine but also from the rigidity with which it is held in place, unless the screws are made large and heavy.

The object of the present invention is to provide a belt-tightening arrangement, whereby adjustments of considerable magnitude may be obtained with screws of relatively short lengths.

To this end my invention consists, generally speaking, of screw-carrying abutments which may themselves be quickly and easily adjusted so as to adjust the screws toward or from the machine, thus permitting the use of short, light screws while at the same time providing a powerful adjusting means and a rigid securing means. The various features of novelty will, however, be pointed out with particularity in the appended claims.

For a full understanding of my invention and of its various objects and advantages, reference is to be had to the following detailed description taken in connection with the accompanying drawing, wherein—

Figure 1:
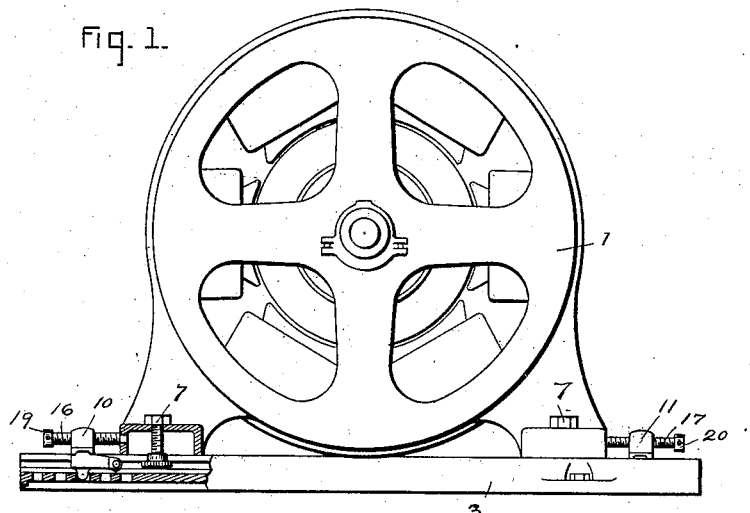
Figures 2, 3:
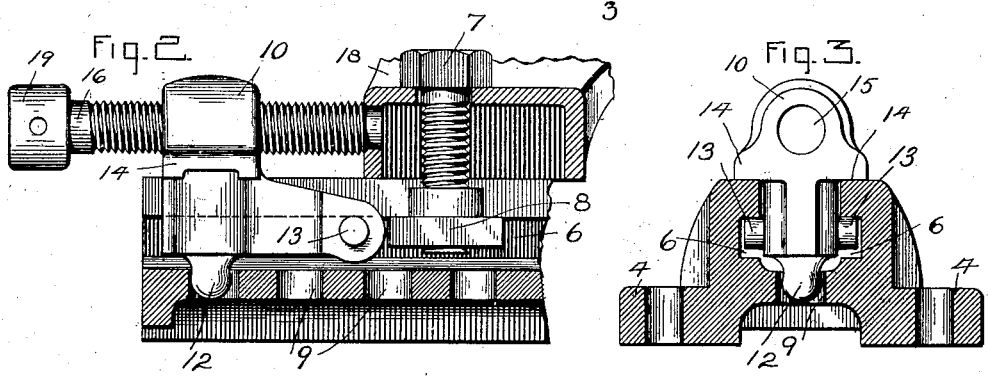
Figure 4:
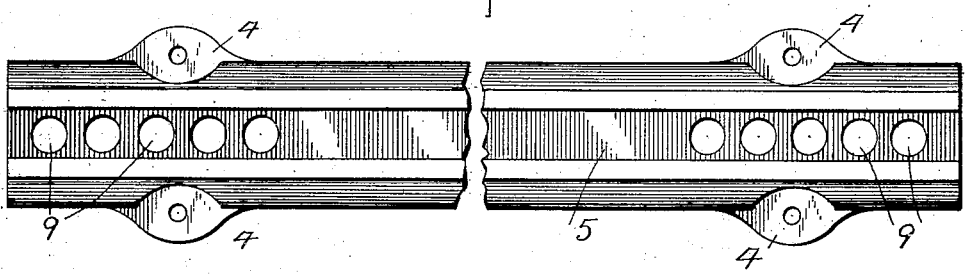

Figure 1 shows in side elevation a dynamo-electric machine having a belt-tightening device arranged in accordance with a preferred form of my invention, portions being shown in cross-section in order to more clearly show the belt-tightener; Fig. 2 is an enlarged view of the same parts shown in cross-section of Fig. 1, Fig. 3 is a section taken at right angles to Fig. 2; and Fig. 4 is a plan view of one of the rails upon which slides the machine proper.

Referring to the drawing, 1 indicates a machine which it is desired to adjustably support upon its base. The machine illustrated is a dynamo-electric machine, but my invention is, of course, not limited to this particular class of machines. The machine rests upon two parallel rails, only one of which, indicated by the reference character 3, is shown in the drawing. These rails are provided with projecting ears 4, or other means, whereby they may be rigidly secured in position. Each rail is provided with a longitudinal channel 5 in its upper surface, having undercut portions 6 in the opposite sides thereof. This channel may conveniently be made T-shaped in cross-section, as shown. The machine is guided in its movements by these rails as, for example, by means of bolts 7, screw-threaded into T-headed nuts 8 slidingly arranged in the channels in the rails. All these parts, except as hereinafter specified, may take any usual or preferred forms.

In accordance with the present invention, each rail is provided at one end, and if desired, at both ends, with a number of shoulders which may conveniently be produced by forming holes 9 in the rail at the bottom of the slot. A pair of abutments 10 and 11 in the form of L-shaped dogs, are provided, one for each rail; they being arranged at opposite ends of the rails. When the dogs are in position on the rails one arm projects upwardly and the other arm extends horizontally toward the machine. Each dog has a lug 12 projecting downwardly from the rear end of the horizontal arm and adapted to enter one of the holes 9, and laterally-projecting lugs 13 adjacent the outer end of the horizontal arm and adapted to enter into the undercut portions in the channels. Each dog is also preferably provided with overhanging shoulders 14 formed on the upwardly-projecting arm and which, when the parts are assembled, rest upon the upper surface of the rails. At a point above the shoulders 14 each dog is provided with a screw-threaded opening 15, extending parallel to the rails. Screws 16 and 17, passing respectively through the openings in the abutments 10 and 11, engage with the frame 18 of the machine at their inner ends and at their outer ends are provided with heads 19 and 20, or other means whereby they may be turned.

Assuming that the dog at one end of the machine is in the position shown in Fig. 2, then, upon loosening the screw at the other side of the machine, and turning the screw 16 in the proper direction, the machine is moved toward the right. The distance through which the machine may be thus moved depends upon the length of the screw. During this operation, the lug 12 takes the backward thrust upon the dog, while the lugs 13 and shoulders 14, respectively, take the downward and upward thrusts on the dog, due to the tendency of the dog to rotate about the lug 12 as a center. If it is desired to shift the machine still farther to the right, the screw 16 is backed off, and the dog 10 may then be oscillated slightly upon the lugs 13 as a center so as to lift the lug 12 out of the hole in which it is located, whereupon the dog is shifted to the right and the lug 12 entered into the second of the holes in the rail. Upon again turning the screw, the machine is moved in the same direction as before. This process of shifting the position of the dog and operating the screw may be continued until the lug 12 has entered the last of the holes and the machine brought to its extreme position. After the machine has been brought to any desired position, the screws at both ends thereof are set up and the machine is rigidly locked in such adjusted position.

It will be seen that by providing a sufficient number of holes in the rails, a short screw may be used to adjust the machine through a wide range. Therefore, since the dogs may be small and compact, a neat and at the same time powerful adjusting and locking device is obtained. Where each rail is made double-ended, as shown, the dog may be placed at either end, according as conditions may require or make it advisable.

Various changes may of course be made in the embodiment illustrated without departing from the scope of my invention as defined in the claims, and by said claims I intend to cover all such changes.

What I claim as new, and desire to secure by Letters Patent of the United States, is,—

1. In combination, a machine, a base having a guide for slidably supporting said machine, said guide having a longitudinally extending undercut channel and a plurality of longitudinally spaced openings, an abutment arranged to be seated in any one of said openings and having a shoulder engaging the undercut portion of said channel, and a member in screw-threaded relation to said abutment arranged to engage the machine.

2. In combination, a machine, a guide rail for said machine having a longitudinally extending undercut channel and a plurality of longitudinally spaced openings, an abutment having a shoulder for entering the undercut portion of said channel and another shoulder arranged to be seated in any one of said openings, and a member screw-threaded to said abutment and arranged to engage with said machine to move it along the guide rail.

3. In combination, a guide rail having a longitudinally-extending undercut channel and a plurality of shoulders along the channel, an abutment having a shoulder adapted to engage any of the shoulders on the guide rail and a shoulder for entering the undercut portion of said channel, and a screw carried by said abutment.

4. In combination, a guide rail having a longitudinally-extending undercut channel and a plurality of shoulders arranged along said channel, an abutment having shoulders to engage respectively with the top of said rail and with any one of said shoulders arranged along said channel and a lug arranged to enter in the said undercut portion of said channel.

In witness whereof I have hereunto set my hand this ninth day of January, 1907.

JULES ERNEST DELHOMME.

Witnesses:
  WERNER HILDEBRAND,
  HANSON C. COXE.